United States Patent [19]

Richey et al.

[11] Patent Number: 5,749,317
[45] Date of Patent: May 12, 1998

[54] PET LITTER CABINET

[76] Inventors: Richard Mark Richey; Sandra Barbra Richey, both of 7033 Gillis, Boise, Id. 83703

[21] Appl. No.: 588,016

[22] Filed: Jan. 17, 1996

[51] Int. Cl.⁶ .............................................. A01K 29/00
[52] U.S. Cl. ........................... 119/166; 119/165; 209/373
[58] Field of Search ............................. 119/165, 166, 119/167; 209/373, 374, 417–419

[56] References Cited

U.S. PATENT DOCUMENTS

| | | | |
|---|---|---|---|
| 1,390,455 | 9/1921 | McCollom. | |
| 2,963,003 | 12/1960 | Oberg et al. | 119/1 |
| 3,100,474 | 8/1963 | Schneider | 119/1 |
| 3,141,441 | 7/1964 | Russell | 119/166 |
| 3,332,397 | 7/1967 | Vander Wall | 119/166 |
| 3,752,120 | 8/1973 | Pallesi | 119/166 |
| 3,796,188 | 3/1974 | Bradstreet | 119/166 |
| 3,809,013 | 5/1974 | Rigney et al. | 119/1 |
| 3,872,832 | 3/1975 | Quinn | 119/1 |
| 3,954,086 | 5/1976 | Maness | 119/1 |
| 4,217,857 | 8/1980 | Geddie | 119/1 |
| 4,312,295 | 1/1982 | Harrington | 119/1 |
| 4,327,667 | 5/1982 | Bilak | 119/166 |
| 4,359,966 | 11/1982 | Casino | 119/1 |
| 4,505,226 | 3/1985 | Carlson | 119/1 |
| 4,522,150 | 6/1985 | Gershman | 119/165 |
| 4,602,593 | 7/1986 | Gross | 119/166 |
| 4,615,300 | 10/1986 | McDonough | 119/1 |
| 4,627,381 | 12/1986 | Reed et al. | 119/165 |
| 4,723,510 | 2/1988 | Skillestad | 119/1 |
| 4,739,725 | 4/1988 | Fennelly | 119/1 |
| 4,802,442 | 2/1989 | Wilson | 119/1 |
| 4,817,560 | 4/1989 | Prince et al. | 119/166 |
| 4,854,267 | 8/1989 | Morrow | 119/1 |
| 4,858,561 | 8/1989 | Springer | 119/1 |
| 4,970,987 | 11/1990 | Deyle | 119/166 |
| 5,014,649 | 5/1991 | Taft | 119/168 |
| 5,062,392 | 11/1991 | Lavash | 119/167 |
| 5,158,042 | 10/1992 | Hammerslag et al. | 119/167 |
| 5,168,834 | 12/1992 | Buschur | 119/166 |
| 5,181,480 | 1/1993 | Dabolt | 119/165 |
| 5,184,568 | 2/1993 | Healey | 119/19 |
| 5,207,772 | 5/1993 | Lauretta et al. | 119/167 |
| 5,211,133 | 5/1993 | Foley | 119/166 |
| 5,211,134 | 5/1993 | Bolo, III | 119/168 |
| 5,249,549 | 10/1993 | Rockaitis, III | 119/165 |
| 5,361,725 | 11/1994 | Baillie et al. | 119/165 |
| 5,507,248 | 4/1996 | Gabbert | 119/166 |
| 5,517,947 | 5/1996 | Christman | 119/165 |
| 5,531,186 | 7/1996 | Flood et al. | 119/166 |
| 5,575,238 | 11/1996 | Redman | 119/165 |

FOREIGN PATENT DOCUMENTS

| | | | |
|---|---|---|---|
| 610933 | 8/1994 | European Pat. Off. | 119/166 |
| 3243697 | 5/1984 | Germany | 119/166 |
| 4127835 | 12/1992 | Germany | 119/166 |

*Primary Examiner*—John G. Weiss
*Assistant Examiner*—Francis K. Cuddihy
*Attorney, Agent, or Firm*—Ken J. Pedersen; Barbara S. Pedersen

[57] ABSTRACT

Embodiments of a pet litter cabinet and methods of litter area control are shown and described. Each embodiment includes a cabinet-style enclosure with a door allowing access to a plurality of removable litter drawers. The drawers are adapted to be interchangable inside the cabinet and each drawer includes a screened or perforated bottom and a slide for temporarily covering the bottom openings. To clean the litter area, the cabinet door is opened and top drawer slide is pulled to uncover the bottom opening of the top drawer. This allows clean, loose granules of adsorbent to fall into the bottom drawer, leaving the dirty clumps and waste behind in the top drawer. The clumps and waste are then emptied from the top drawer, and the two drawers are switched in position inside the cabinet.

12 Claims, 3 Drawing Sheets

PET LITTER CABINET

BACKGROUND OF THE INVENTION

1. Field of the Invention

This invention relates generally to pet litter boxes. More specifically, this invention relates to enclosed litter boxes with a plurality of litter trays.

2. Related Art

Many pet litter boxes have been designed for increased ease of adsorbent material removal, ease of pet waste removal, or for concealment of the litter area. Many patents disclose means for screening the litter adsorbent material to remove clumps of pet waste, for example, U.S. Pat. No. 3,141,441 (Russel), U.S. Pat. No. 2,963,003 (Oberg, et al.), U.S. Pat. No. 3,809,013 (Rigney, et al.), U.S. Pat. No. 4,217,857 (Geddie), U.S. Pat. No. 4,312,295 (Harrington), U.S. Pat. No. 4,359,966 (Casino), U.S. Pat. No. 4,505,226 (Carlson), U.S. Pat. No. 4,615,300 (McDonough), U.S. Pat. No. 4,723,510 (Skillestad), U.S. Pat. No. 4,802,442 (Wilson), U.S. Pat. No. 5,062,392 (Lavash), U.S. Pat. No. 5,158,042 (Hammerslag, et al.), U.S. Pat. No. 5,207,772 (Lauretta, et al.). Some patents disclose stacked or nesting trays for allowing transfer of litter adsorbent from one tray to the other, for example, U.S. Pat. No. 3,908,597 (Taylor) and U.S. Pat. No. 3,796,188 (Bradstreet). Other patents disclose containers or enclosures which substantially surround the litter area, for example, U.S. Pat. No. 3,872,832 (Quinn), U.S. Pat. No. 4,858,561 (Springer), U.S. Pat. No. 5,181,480 (Dabolt), U.S. Pat. No. 5,211,134 (Bolo), U.S. Pat. No. 3,954,086 (Maness), and U.S. Pat. No. 3,100,474 (Schneider).

Still, there is a need for an attractive litter system that includes easy and neat removal of pet waste and changeout of adsorbent material.

SUMMARY OF THE INVENTION

This invention is a pet litter system comprising a cabinet that provides for neat and quick litter area cleaning with minimum handling of pet litter materials and equipment. The cabinet comprises an enclosure having an interior space for receiving a plurality of litter drawers, which are preferably slidably supported in the cabinet and which preferably include a first and second drawer in a top and bottom position in a lower region of the interior space, respectively. The cabinet preferably includes a door in a sidewall that allows for drawer removal and a pet door located above the top drawer for the animal to enter and exit the cabinet. Preferably, the litter drawers each have a bottom, which includes a screening means, such as a screen or perforated plate, and a removable cover means for temporarily blocking the screening means, for example, a slide for covering and uncovering the screening means.

The cabinet is preferably generally a furniture-console shaped single unit, that is, generally a box-shape, with a substantially flat, outer top surface, which serves to adapt the cabinet for dual use as a table surface, storage surface, elevated cat bed, etc.

DESCRIPTION OF THE PREFERRED EMBODIMENTS

Figure 1:
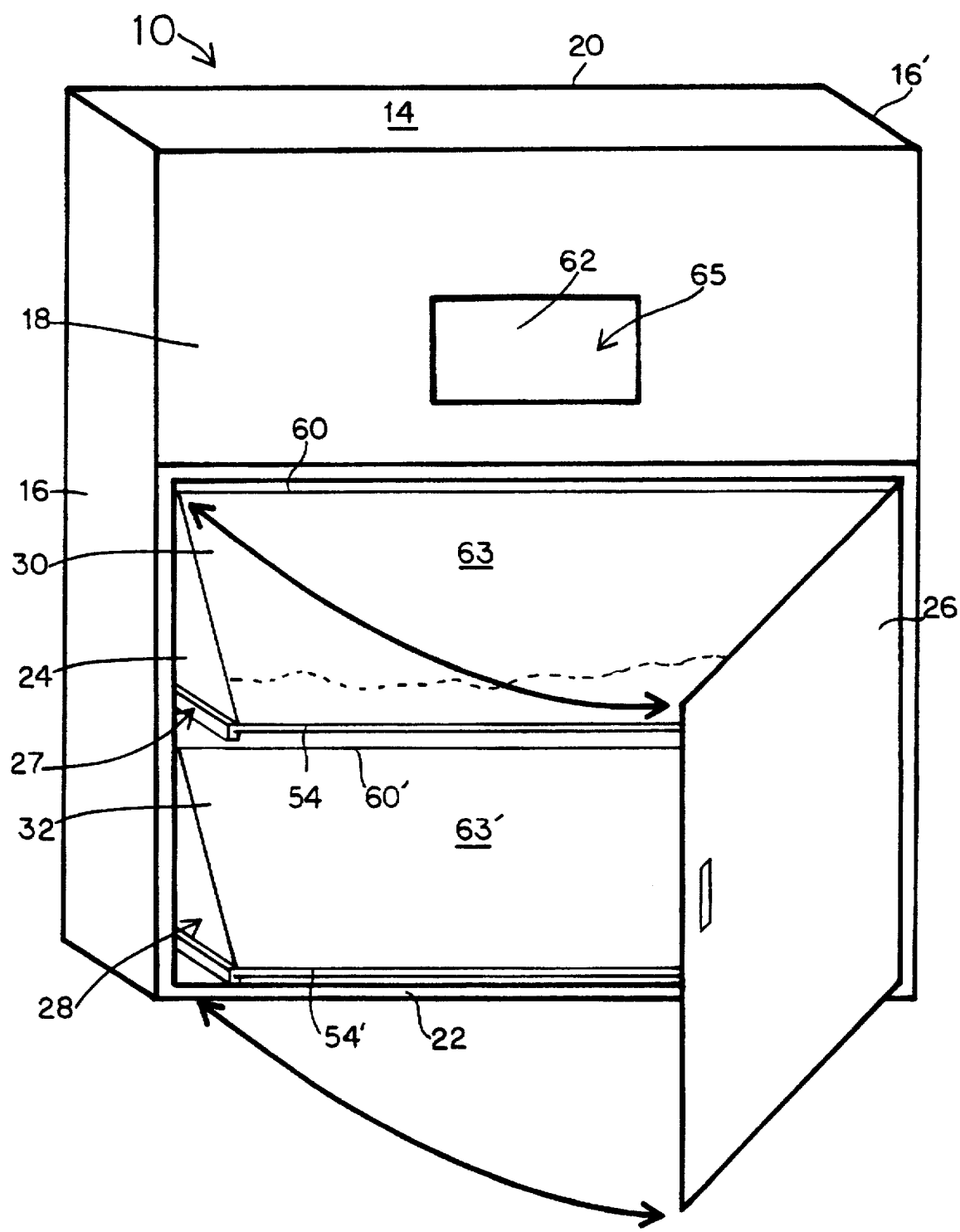
FIG. 1 is a front perspective view of one embodiment of the invention.
Figure 2:
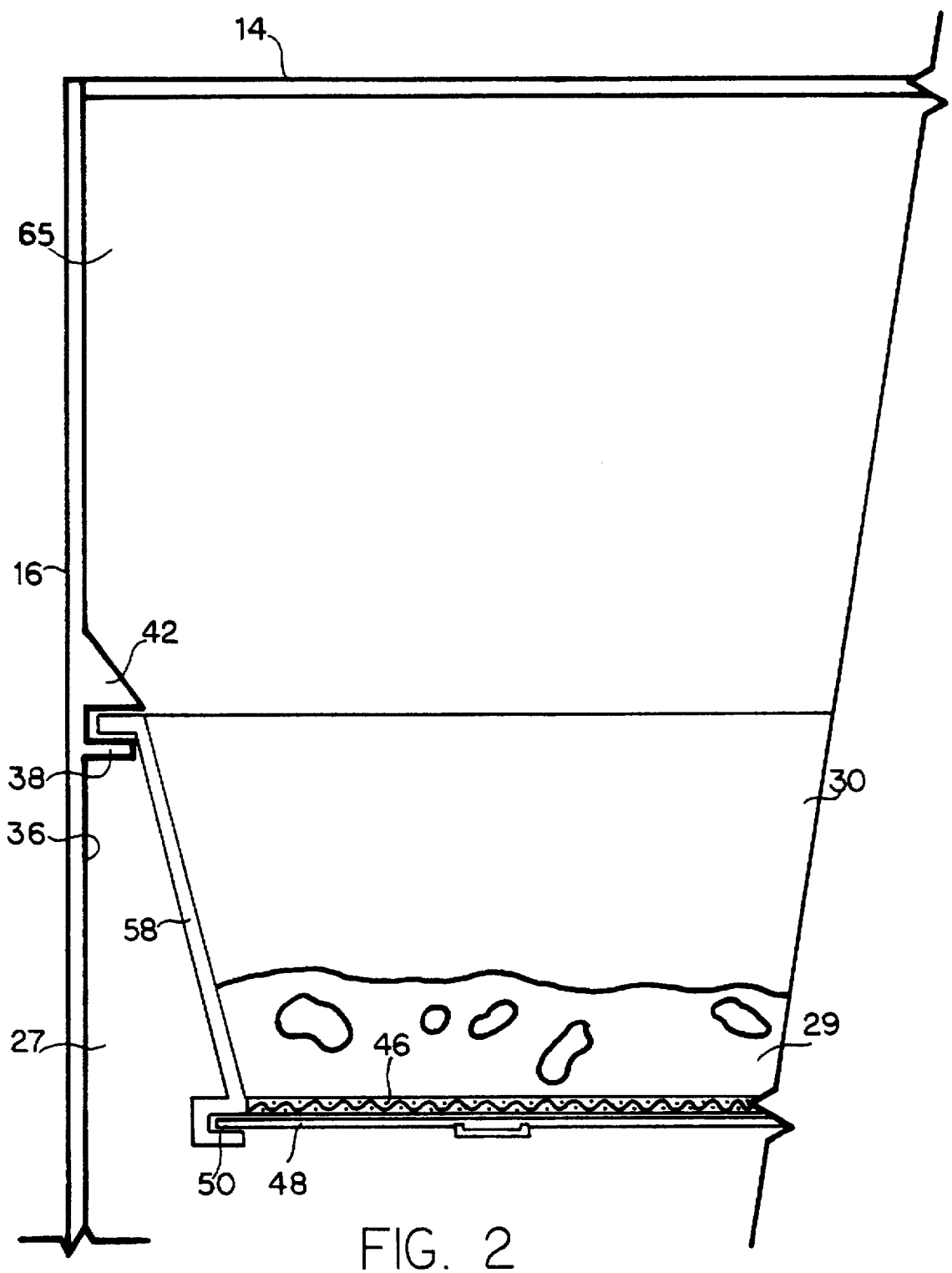
FIG. 2 is a detail view of the embodiment of FIG. 1, showing part of the top drawer and support means.
Figure 3:
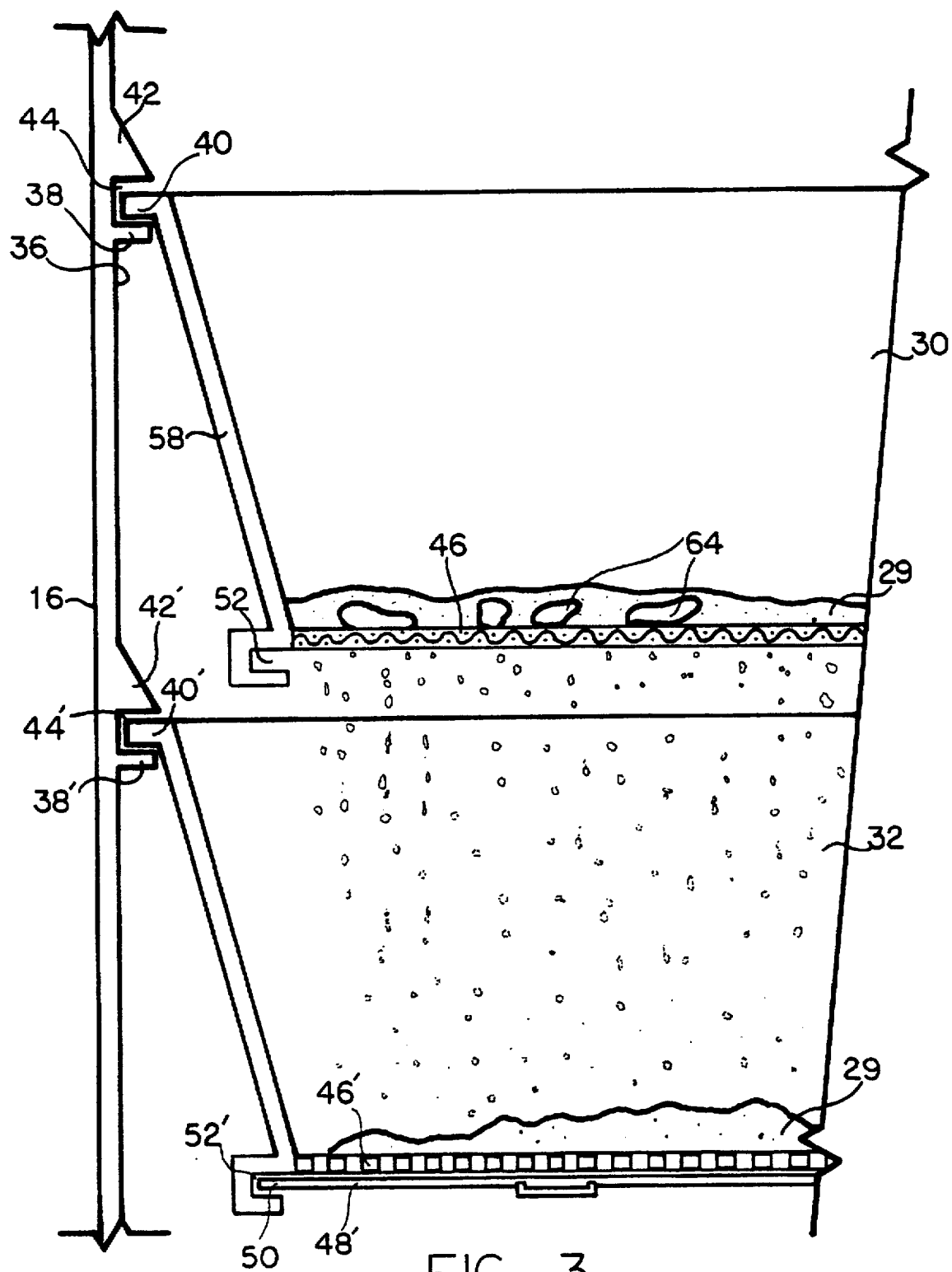
FIG. 3 is a detail view of the embodiment of FIG. 1, showing part of the top and bottom drawers during screening of adsorbent.

Referring to the Figures, there is shown one, but not the only, embodiment of the invented pet litter cabinet. The cabinet 10 comprises an enclosure of generally a furniture-console shape, having a substantially horizontal and planar outer top surface 14 and a generally vertical sidewall, which comprises left wall 16, right wall 16', front wall 18, and back wall 20. The cabinet 10 preferably also includes a bottom wall 22, for adding strength and for enclosing the litter area. Front wall 18 has a drawer-removal doorway 24 covered by a hinged door 26, which allows access to the interior space 28 of the cabinet 10.

Behind the door 26, two generally rectangular drawers 30, 32 are slidably supported inside the lower region 27 of the cabinet interior space for holding adsorbent material 29 such as the well-known granular litter box filler. The generally horizontal drawers 30, 32 are vertically-aligned, that is, one-on-top-of-the-other, but do not nest or touch. This allows each drawer 30, 32 to be independently removed from the cabinet 10 by being slid horizontally out from the doorway 24 after the door 26 is opened.

The drawers and support means are designed so that either drawer may fit in either top or bottom position, thus, making the two drawers interchangable. The preferred support means for each drawer 30, 32 is located on the left and right wall 16, 16' interior surfaces 36. The preferred support means comprises a horizontal rail 38, 38' for supporting a horizontal lip 40, 40' extending from each drawer near the top edge of the drawers, and a guide 42, 42'. The drawer lip 40, 40' slides in the horizontal slot 44, 44' between the rail 38, 38' and the guide 42, 42'. Alternatively, the drawers 30, 32 may be supported by other means, for example, rollers or other conventional drawer movement means.

Each drawer 30, 32 has a bottom 54, 54' that includes a screening means 46, 46'. For example, screening means 46 is depicted as a conventional screen material extending across an open drawer bottom 54, and screening means 46' is depicted as a perforated bottom plate. The screening means 46, 46' may be fixedly or removably attached.

A slide 48, 48' extends across each drawer bottom 54, 54' beneath the screening means 46, 46' to block the openings. Each slide 48, 48' is held in place by a support means, in which edges 50 of the slides are received in horizontal slots 52, 52' formed in the bottom 54, 54' of the drawers. Therefore, slide 48, 48' may be slid inward under the drawer opening and screen to close the drawer bottom 54, 54' and retain the adsorbent material 29 in the drawer. The slide also may be slid out to open the drawer bottom 54, 54' to allow the adsorbent 29 to fall out of the drawer.

Each drawer 30, 32 preferably has sloping walls 58 that make the drawer bottom 54, 54' smaller than the drawer top 60, 60'. The bottom opening preferably extends substantially all the way between the walls 58. Thus, when the slide is pulled out to empty the drawer, the loose adsorbent material falls out without hanging up on any ledges.

A pet doorway 62 is located in a wall of the cabinet 10 above where the drawers 30, 32 are located. Preferably the pet doorway 62 is in the front wall 18, on the same wall as the doorway 24. The pet doorway 62 provides access for an animal to enter the upper region 65 of the interior space of the cabinet 10 to use the top drawer 30 for a litter box.

Optionally, a swinging door (not shown) may be added to the pet doorway 62 to further enclose the litter area for added odor-prevention. In this case, the pet door should be translucent, or other means should be provided to let some light into the top drawer area. Optionally, there may be a ledge or other structure near the pet doorway 62 for making easier the pet's entry or exit. Optionally, carpet or other material may be included at or near the pet doorway 62 or ledge for brushing or cleaning the feet during the pet's exit. Optionally, odor-adsorbing or covering devices may be inserted into the cabinet 10 or stuck onto the interior surface 36.

The cabinet 10 design substantially encloses the drawers 30, 32 and the entire litter area, which creates an attractive piece of furniture and tends to contain odor, dust, and hide the litter area from view. The door 26 covers the drawers fronts 63, 63' and remains closed except during the quick adsorbent screening and drawer switching process. Therefore, the only opening in the cabinet enclosure during normal use is the pet doorway 62, which is small enough and positioned in such a way as to not create a direct view of the litter area. Optionally, the doorway 24 may be covered by more than one door, but a single door extending all the way across the doorway 24 is preferred so that the pet owner may operate the door with one hand while holding a drawer or other item in his/her other hand.

In use, the litter cabinet 10 is placed in a preferred location, which, because of the attractive, furniture-like appearance of the cabinet 10, may be an entryway, hallway, family room, etc. The top surface 14 is preferably about 24–36 inches above the floor and may easily be used as an end-table or a storage and display surface. For example, the top surface 14 may be used to hold other pet supplies, such as cat food or toys. Pets jump or step through the pet doorway 62 to use the top litter drawer.

To clean the litter area, the door 26 is opened, the top drawer slide 48 is pulled out so that the clean, loose adsorbent 29 falls through the screen 46 into the empty drawer 32 below. Feces and clumped adsorbent 64 remain in the top drawer 30. The slide 48 is then pushed back under the top drawer 30 to prevent any more granules or dust from falling out, and the top drawer 30 is pulled out through the doorway 26 and emptied. The bottom drawer 32, now containing clean adsorbent material 29, is pulled out of its bottom position and inserted into the top position for the pet's use. The clean, empty drawer 30 is placed in the bottom position. The cabinet 10 is then ready for another cycle, which includes: pet use, screening, emptying, and repositioning. Fresh adsorbent may be added to the drawers as appropriate.

The cabinet 10 therefore fulfills many useful purposes. It provides an enclosed litter system that keeps the litter area out of sight and keeps odors contained. At the same time, the cabinet 10 prevents the litter container from being stepped in, kicked, or spilled, and provides an elevated top surface for practical uses. The two screen-bottomed drawers allow convenient, neat, and quick separation of dirty adsorbent and waste from clean adsorbent and placement of clean adsorbent in position for use.

Although this invention has been described above with reference to particular means, materials and embodiments, it is to be understood that the invention is not limited to these disclosed particulars, but extends instead to all equivalents within the scope of the following claims.

I claim:

1. A pet litter cabinet for use with adsorbent material, the cabinet comprising:

a pet enclosure defining an interior space, the enclosure comprising a sidewall that is generally vertical and a top wall, the sidewall having an interior surface and a drawer-removal doorway for providing access to a lower region of the interior space and a pet doorway for providing access into an upper region of said interior space;

a door connected to the enclosure and extending across said drawer-removal doorway;

a first drawer and a second drawer received in the said interior space lower region for receiving adsorbent, said first drawer being in a top position in said lower region and said second drawer being in a bottom position in said lower region, each of said first and second drawers having a bottom with a screening means, a removable cover means for temporarily blocking the screening means, and a lip extending from each of said first and second drawers;

wherein said pet doorway provides a pet access to said first drawer in the top position for use as a litter area; and support means for supporting said first and second drawers in the interior space, the support means for the first drawer being attached to said interior surface of the sidewall of said enclosure and supporting said lip of said first drawer, wherein each of said first and second drawers may be independently pulled out and removed from the enclosure through said drawer-removal doorway and wherein each of said first and second drawers may be replaced independently in either the top position or bottom position in said lower region of the interior space; and whereby the first drawer, when in the top position is cleaned by removing the cover means of the first drawer so that clean adsorbent falls through the screening means into the second drawer in the bottom position, by removing the first drawer from said enclosure and emptying pet waste, and by switching said second drawer to the top position and said first drawer to the bottom position.

2. A pet litter cabinet for use with adsorbent material, the cabinet comprising:

an enclosure defining an interior space, the enclosure comprising a sidewall and a top wall, the sidewall having a drawer-removal doorway for providing access to a lower region of the interior space and a pet doorway for providing access into an upper region of said interior space, wherein the sidewall comprises a front wall having both said drawer-removal doorway and said pet doorway, and wherein said pet doorway is located directly above said drawer-removal doorway;

a door connected to the enclosure and extending across said drawer-removal doorway;

a first drawer and a second drawer received in the said interior space lower region for receiving adsorbent, said first drawer being in a top position in said lower region and said second drawer being in a bottom position in said lower region, each of said first and second drawers having a bottom with a screening means, and a removable cover means for temporarily blocking the screening means;

wherein said pet doorway provides a pet access to said first drawer in the top position for use as a litter area; and support means for supporting said first and second drawers in the interior space, wherein each of said first and second drawers may be independently pulled out and removed from the enclosure through said drawer-removal doorway and wherein each of said first and second drawers may be replaced independently in either the top position or bottom position in said lower region of the interior space; and whereby the first drawer, when in the top position, is cleaned by removing the cover means of the first drawer so that clean adsorbent falls through the screening means into the second drawer in the bottom position, by removing the first drawer from said enclosure and emptying pet waste, and by switching said second drawer to the top position and said first drawer to the bottom position.

3. A cabinet as set forth in claim 1, wherein the top wall has a top surface that is generally horizontal and planar.

4. A cabinet as set forth in claim 3, wherein the enclosure further has a bottom wall and the top surface is 24–36 inches above the bottom wall for use as a storage and display surface.

5. A cabinet as set forth in claim 1, wherein the cabinet comprises a single door extending across said drawer-removal doorway.

6. A cabinet as set forth in claim 1, wherein each removable cover means comprises a generally horizontal slide adapted for being pulled out from one of the first and second drawers through said drawer-removal doorway and for being pushed in toward said one of the first and second drawers for blocking the screening means.

7. A cabinet as set forth in claim 1, wherein said first drawer and said second drawer are supported in the interior space so that said first drawer and second drawer are vertically-aligned and so that said first drawer and second drawer do not touch each other.

8. A cabinet as set forth in claim 2, wherein the top wall has a top surface that is generally horizontal and planar.

9. A cabinet as set forth in claim 8, wherein the enclosure further has a bottom wall and the top surface is 24–36 inches above the bottom wall for use as a storage and display surface.

10. A cabinet as set forth in claim 2, wherein the cabinet further comprises a single door extending across said drawer-removal doorway.

11. A cabinet as set forth in claim 2, wherein each removable cover means comprises a generally horizontal slide adapted for being pulled out from one of the first and second drawers through said drawer-removal doorway and for being pushed in toward said one of the first and second drawers for blocking the screening means.

12. A cabinet as set forth in claim 2, wherein said first drawer and said second drawer are supported in the interior space so that said first drawer and second drawer are vertically-aligned and so that said first drawer and second drawer do not touch each other.

* * * * *